(12) United States Patent
Bae et al.

(10) Patent No.: US 9,398,235 B2
(45) Date of Patent: Jul. 19, 2016

(54) APPARATUS AND METHOD FOR FUSING IMAGES

(71) Applicants: HANWHA TECHWIN CO., LTD., Changwon-Si (KR); KOREA UNIVERSITY RESEARCH AND BUSINESS FOUNDATION, Seoul (KR)

(72) Inventors: Jeong-min Bae, Seoul (KR); Han-Seok Ko, Seoul (KR); Bon-Hwa Ku, Seoul (KR); Du-Bok Park, Seoul (KR); Min-Jae Kim, Seoul (KR); Jae-Yong Ju, Seoul (KR)

(73) Assignees: KOREA UNIVERSITY RESEARCH AND BUSINESS FOUNDATION, Seoul (KR); Hanwha Techwin Co., Ltd., Changwon-si (KR)

( * ) Notice: Subject to any disclaimer, the term of this patent is extended or adjusted under 35 U.S.C. 154(b) by 252 days.

(21) Appl. No.: 14/072,842

(22) Filed: Nov. 6, 2013

(65) Prior Publication Data

US 2014/0168444 A1 Jun. 19, 2014

(30) Foreign Application Priority Data

Dec. 14, 2012 (KR) ......................... 10-2012-0146621

(51) Int. Cl.
| | |
|---|---|
| *H04N 5/33* | (2006.01) |
| *H04N 5/243* | (2006.01) |
| *H04N 5/265* | (2006.01) |
| *H04N 5/225* | (2006.01) |
| *H04N 5/235* | (2006.01) |

(52) U.S. Cl.
CPC ............... *H04N 5/33* (2013.01); *H04N 5/2258* (2013.01); *H04N 5/2351* (2013.01); *H04N 5/243* (2013.01); *H04N 5/265* (2013.01); *H04N 5/332* (2013.01)

(58) Field of Classification Search
CPC ........... G02B 23/12; H04N 5/33; H04N 7/181
See application file for complete search history.

(56) References Cited

U.S. PATENT DOCUMENTS

| | | | | |
|---|---|---|---|---|
| 2005/0270784 | A1* | 12/2005 | Hahn | G02B 23/12 362/459 |
| 2005/0271258 | A1* | 12/2005 | Rowe | G06K 9/00046 382/124 |
| 2008/0024608 | A1 | 1/2008 | Hahn et al. | |
| 2009/0002475 | A1* | 1/2009 | Jelley | H04N 5/2256 348/14.01 |
| 2010/0177973 | A1* | 7/2010 | Wedi | G06T 5/50 382/233 |
| 2010/0191391 | A1* | 7/2010 | Zeng | G01S 13/723 701/1 |
| 2011/0013048 | A1* | 1/2011 | Wei | G06T 5/009 348/234 |

FOREIGN PATENT DOCUMENTS

| | | |
|---|---|---|
| JP | 2005338359 A | 12/2005 |
| JP | 2008530667 A | 8/2008 |
| KR | 1020110116777 A | 10/2011 |

OTHER PUBLICATIONS

S.S. Al-amri, N.V.Kalyankar, and S.D.Khamitkar, "Linear and Non-linear Contrast Enhancement Image", IJCSNS International Journal of Computer Science and Network Security, vol. 10, No. 2, 2010.*
Kim, Seung-Hun et al, "Efficient Object Tracking System Using the Fusion of a CCD Camera and an Infrared Camera," Journal of Institute of Control, Robotics and Systems, 2011, pp. 229-235.

* cited by examiner

*Primary Examiner* — Jamie Atala
*Assistant Examiner* — Ayman Abaza
(74) *Attorney, Agent, or Firm* — Sughrue Mion, PLLC

(57) ABSTRACT

Provided is a method of merging or fusing a visible image captured by a visible camera and an infrared (IR) image captured by an IR camera. The method includes: providing a first image of a subject captured by a first camera and a second image of the subject captured by a second camera; converting brightness of the second image based on brightness of the first image; and merging the first image and the second image having the converted brightness.

17 Claims, 4 Drawing Sheets

FIG. 2A
FIG. 2B
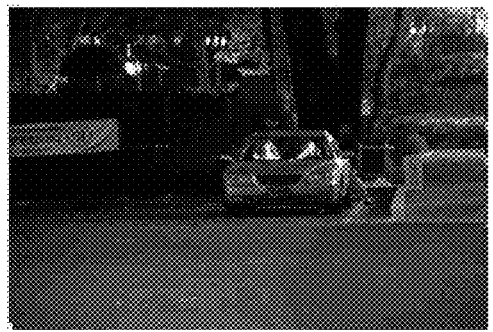
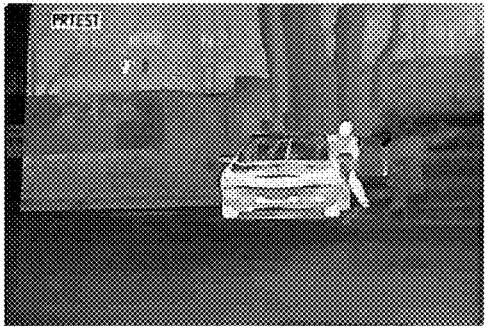
FIG. 3A
FIG. 3B
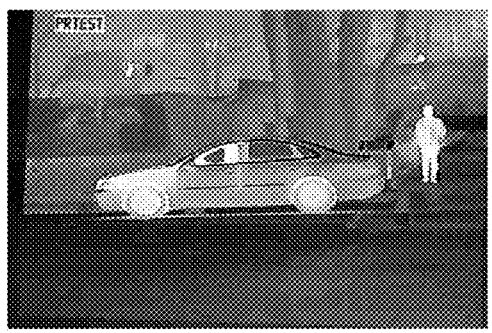
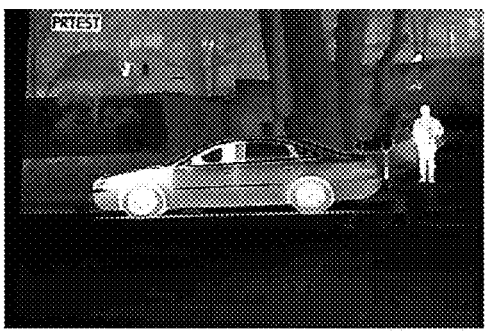

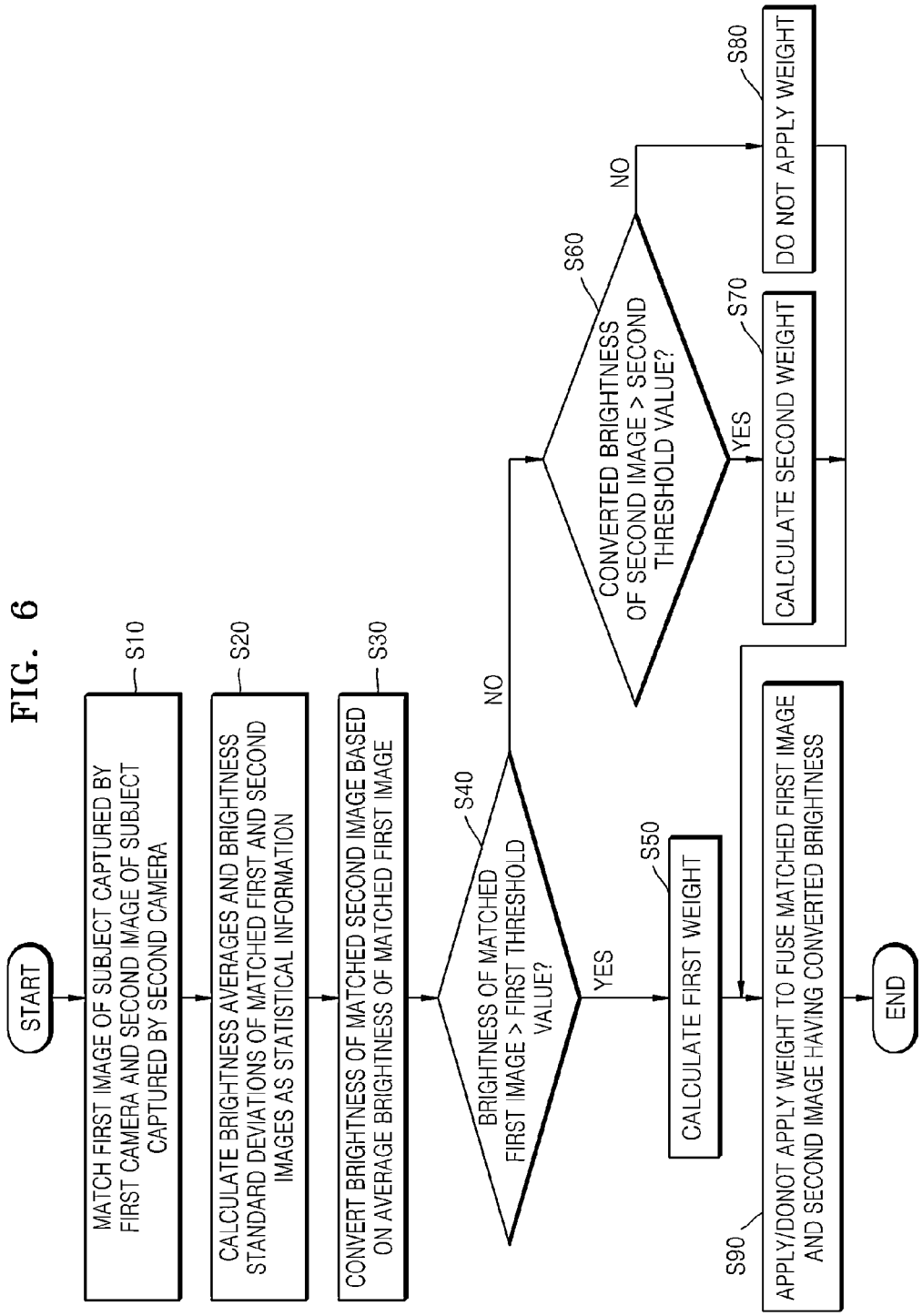

APPARATUS AND METHOD FOR FUSING IMAGES

CROSS-REFERENCE TO RELATED PATENT APPLICATION

This application claims priority from Korean Patent Application No. 10-2012-0146621, filed on Dec. 14, 2012, in the Korean Intellectual Property Office, the disclosure of which is incorporated herein by reference in its entirety.

BACKGROUND

1. Field

Apparatuses and methods consistent with exemplary embodiments relate to merging or fusing images, and more particularly, to merging or fusing a visible image captured by a visible camera and an infrared (IR) image captured by an IR camera.

2. Description of the Related Art

In the related art, texture and information of a visible image captured by a visible camera may be collected, but it is difficult to change illumination of the visible image. On the other hand, an infrared (IR) image captured by an IR camera is not affected by an illumination change, but instead, it is very difficult to collect texture information from the IR image.

SUMMARY

One or more exemplary embodiments provide an apparatus and a method for complementing a weakness with respect to the illumination of a visible camera and a weakness with respect to collecting the texture information of an infrared (IR) camera by merging the images from the visible camera and the IR camera so as to improve an image performance.

According to an exemplary embodiment, there is provided a method of merging images. The method may include: providing a first image of a subject captured by a first camera and a second image of the subject captured by a second camera; converting brightness of the second image based on brightness of the matched first image; and merging the first image and the second image having the converted brightness.

The providing the first and second image includes: matching the first image; matching the second image captured at a different wavelength range from the first image; and providing the matched first and second images.

The first camera may be a visible camera, and the second camera may be an infrared (IR) camera.

The method may further include: calculating a brightness average and a brightness standard deviation of each of the first and second images.

The converting the brightness of the matched second image may include: performing brightness enhancement processing in response to the second image having a higher brightness average than the brightness average of the first image; and performing brightness attenuation processing in response to the second image having a lower brightness average than the brightness average of the first image.

The performing the brightness enhancement processing may include multiplying a difference between a brightness value of the second image and the brightness average of the first image by the brightness average of the first image.

The performing the brightness attenuation processing may include dividing a difference between a brightness value of the second image and the brightness average of the first image by the brightness average of the first image.

The method may further include: calculating a first weight to apply the first weight to the first image when merging the first and second images in response to brightness of the first image being higher than a first threshold value; and calculating a second weight to apply the weight to the second image when merging the first and second images in response to the converted brightness of the second image being higher than a second threshold value.

The first threshold value may be calculated by adding a brightness average of the second image to a product of a first constant and a brightness standard deviation of the second image, and the second threshold value may be calculated by adding a brightness average of the first image to a product of a second constant and a brightness standard deviation of the first image.

According to an aspect of another exemplary embodiment, there is provided an apparatus for merging images. The apparatus may include: a first camera configured to capture a first image of a subject; a second camera configured to capture a second image of the subject, the second image captured at a different wavelength range from the first camera; a converter configured to convert brightness of the second image based on brightness of the first image; and a merger configured to merge the first image and the second image having the converted brightness.

The apparatus may further include a matching unit configured to match the first image of the subject and configured to match the second image of the subject.

The first camera may be a visible camera, and the second camera may be an IR camera.

The apparatus may further include: a statistical information calculator configured to calculate a brightness average and a brightness standard deviation each of the matched first and second images.

The converter may be configured to perform brightness enhancement processing in response to the second image having a higher brightness average than the brightness average of the first image and may be configured to perform brightness attenuation processing in response to the second image having a lower brightness average than the brightness average of the first image.

The converter may be configured to perform the brightness enhancement processing by multiplying a difference between a brightness value of the second image and the brightness average of the first image by the brightness average of the first image.

The converter may be configured to perform the brightness attenuation processing by dividing a difference between a brightness value of the second image and the brightness average of the first image by the brightness average of the first image.

The apparatus may further include: a weight calculator configured to calculate a first weight to apply the first weight to the first image when the merger merges the first and second images in response to brightness of the first image being higher than a first threshold value and configured to calculate a second weight to apply the second weight to the second image when the merger merges the first and second images in response to the converted brightness of the second image being higher than a second threshold value.

The first threshold value may be calculated by adding a brightness average of the second image to a product of a first constant and a brightness standard deviation of the second image, and the second threshold value may be calculated by adding a brightness average of the first image to a product of a second constant and a brightness standard deviation of the first image.

According to an aspect of yet another exemplary embodiment, there is provided a non-transitory computer-readable recording medium storing a computer program for executing the method.

BRIEF DESCRIPTION OF THE DRAWINGS

The above and/or other features and advantages of the disclosure will become more apparent by describing in detail exemplary embodiments thereof with reference to the attached drawings in which:

FIGS. 2A and 2B are views illustrating a matched first image and a matched second image, respectively according to an exemplary embodiment;

FIG. 3A illustrates a matched second image according to an exemplary embodiment, and FIG. 3B illustrates a result of brightness processing that is performed with respect to the matched second image of FIG. 3A according to an exemplary embodiment.

FIG. 6 is a flowchart illustrating a method of fusing images according to an exemplary embodiment.

DETAILED DESCRIPTION

Figure 1:
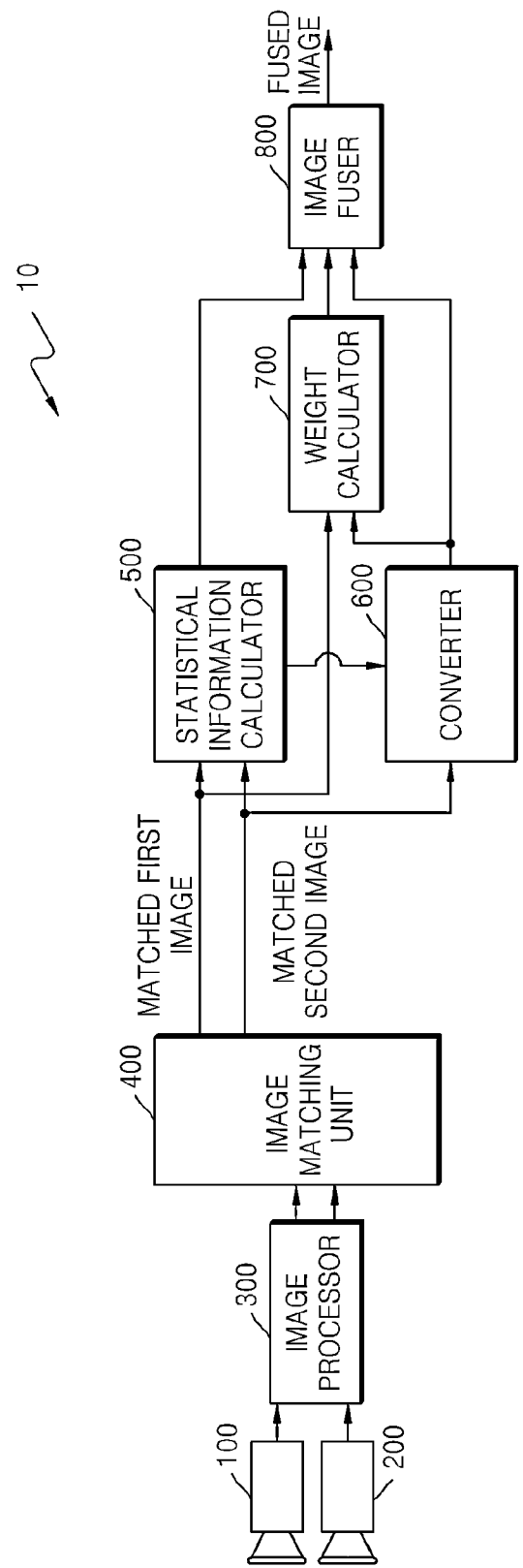
FIG. 1 is a block diagram illustrating a structure of an apparatus for fusing images according to an exemplary embodiment.

While exemplary embodiments are capable of various modifications and alternative forms, the exemplary embodiments thereof are shown by way of example in the drawings and will herein be described in detail. It should be understood, however, that there is no intent to limit the exemplary embodiments to the particular forms disclosed, but on the contrary, the exemplary embodiments are to cover all modifications, equivalents, and alternatives falling within the scope of the inventive concept.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section.

The terminology used herein is for the purpose of describing particular exemplary embodiments only and is not intended to be limiting of the exemplary embodiments. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The present inventive concepts may be embodied as functional block structures and various processing operations. These function blocks may be embodied as the various numbers of hardware and/or software structures that execute particular functions. For example, the present inventive concepts may use direct circuit structures, such as a memory, processing, logic, a look-up table, etc. that may execute various functions through controls of one or more microprocessors or other control apparatuses. Like elements of the exemplary embodiments may be executed as software programming or software elements, the present invention may be embodied as a programming or scripting language such as C, C++, an assembler, or the like, including various algorithms that are realized through combinations of data structures, processes, routines, or other programming structures. Functional sides may be embodied as an algorithm that is executed by one or more processors. Also, the present invention may use related arts to perform electronic environment setting, signal processing, and/or data processing, etc. The terminology, such as a mechanism, an element, a means, or a structure, may be widely used and is not limited as mechanical and physical structures. The terminology may include meanings of a series of routines of software along with a processor, etc.

Hereinafter, references will be made in detail to the exemplary embodiments, examples of which are illustrated in the attached drawings. Like reference numerals in the drawings denote like elements.

FIG. 1 is a block diagram illustrating a structure of an apparatus 10 for fusing images according to an exemplary embodiment.

Referring to FIG. 1, the apparatus 10 includes a first camera 100, a second camera 200, an image processor 300, an image matching unit 400, a statistical information calculator 500, a converter 600, a weight calculator 700, and an image fuser 800.

The first and second cameras 100 and 200 respectively refer to left and right cameras that capture a subject. The first and second cameras 100 and 200 respectively convert first and second images (or moving pictures) input for the same subject into electrical signals, and output the electrical signals.

In the present exemplary embodiment, the first camera 100 is a visible camera in which the first image input for the same subject is provided to a complementary metal oxide semiconductor (CMOS) module or a charge-coupled device (CCD) module through a lens. The CMOS module or the CCD module converts an optical signal of the subject, which has passed through the lens, into an electric signal (or capturing signal), and outputs the electrical signal, that is, the CMOS module or the CCD module outputs the first image as a visible image.

The second camera 200 is an infrared (IR) camera that detects a temperature difference between the subject and a surrounding background through radiant energy emitted from the subject to convert the temperature difference into an electrical signal and output the electrical signal, i.e., output the second image as an IR image. For example, since a human body has a great temperature or radiant energy difference from a surrounding inanimate object, a thermal imaging camera provides an image that may be easily distinguished from a background of the human body. Therefore, the second camera 200 may operate in the daytime and at nighttime, has been widely used for night observations or night operations in the military, and have wide applications in the private and industrial fields.

The image processor 300 reduces noise from the first and second images that are respectively output from the first camera 100 as the visible camera and the second camera 200 as the IR camera and performs image signal processing for improving a color, such as a gamma correction, a color filter array interpolation, a color matrix, a color correction, a color enhancement, or the like.

The image processor 300 performs image signal processing for improving an image quality to generate image data and compresses the generated image data to generate an image file or restore the image data from the image file. A compression formation of an image includes a reversible format or an irreversible format.

The image processor 300 may also functionally perform color processing, blur processing, edge enhancement processing, image analyzing processing, image recognizing processing, image effect processing, or the like. The image processor 300 may perform face recognition processing, scene recognition processing, or the like as the image recognition processing. For example, the image processor 300 may perform luminance level adjusting, color correction, contrast correction, contour enhancement adjusting, screen dividing processing, character image generating, image synthesis processing, or the like.

The image matching unit 400 matches the first and second images. Image matching refers to processing for geometrically matching areas of physically similar images from two or more different image frames acquired at different angles with respect to the same subject. The image matching unit 400 searches images from the first and second cameras 100 and 200 respectively for a common area and matches the first and second images based on the searched common area to acquire one image for each of the first and second images. Contents related to the image matching are well known, and thus their detailed descriptions are omitted.

The statistical information calculator 500 calculates brightness averages and brightness standard deviations of the first and second images as statistical information. The matched first image is illustrated in FIG. 2A, and the matched second image is illustrated in FIG. 2B. The statistical information calculator 500 calculates the brightness averages and the brightness standard deviations from each of the first and second images.

The converter 600 converts brightness of the matched second image based on the brightness average of the matched first image output from the statistical information calculator 500. The converter 600 performs brightness enhancement processing with respect to a predetermined area of the second image having a higher brightness average than the brightness average of the first image and performs brightness attenuation processing with respect to a predetermined area of the second image having a lower brightness average than the brightness average of the first image.

A calculation formula for the brightness enhancement processing and the brightness attenuation processing performed with respect to the second image is as in Equations 1 and 2 below:

$$x_{IRt}=[(x_{IR}-m_{VISIBLE})/m_{VISIBLE}+1]^2, \text{ if } x_{IR} \leq m_{VISIBLE} \quad (1)$$

$$x_{IRt}=[(x_{IR}-m_{VISIBLE}) \times m_{VISIBLE}+1]^2, \text{ if } x_{IR} > m_{VISIBLE} \quad (2)$$

wherein $x_{IRt}$ denotes a pixel brightness value of the converted second image, $x_{IR}$ denotes a pixel brightness value of the matched second image, $m_{VISIBLE}$ denotes a brightness average of the first image.

If brightness of the matched second image is lower than average brightness of the first image as shown in Equation 1 above, the converter 600 performs brightness attenuation processing that is to divide a difference between a brightness value of a corresponding pixel of the second image and an average value of the first image by the average value of the first image. If, on the other hand, the brightness of the matched second image exceeds the average brightness of the first image, the converter 600 multiplies the difference between the brightness value of the corresponding pixel of the matched second image and the average value of the first image by the average value of the first image as shown in Equation 2 above.

FIG. 3A illustrates a matched second image according to an exemplary embodiment, and FIG. 3B illustrates a result of brightness processing that is performed with respect to the matched second image of FIG. 3A according to an exemplary embodiment.

Figure 4:
FIG. 4 is a view illustrating a distorted first image due to strong illumination to which a weight is to be applied according to an exemplary embodiment.

As shown in FIG. 4, the first image may be distorted due to strong illumination, i.e., a flash of a camera. A weight may be applied to prevent such distortion phenomenon of an image caused by this illumination change when fusing images. A weight may be applied to enhance important information of the second image.

The weight calculator 700 calculates a first weight if brightness of the matched first image is higher than a first threshold value. The weight calculator 700 calculates a second weight if the brightness of the matched first image is determined to be not higher than the first threshold value and brightness of the converted second image output from the converter 600 is higher than a second threshold value. If the above-conditions are not satisfied, that is, the brightness of the matched first image is determined to be not higher than the first threshold value and the brightness of the converted second image output from the converter 600 is not higher than the second threshold value, the weight is not applied.

The weight calculator 700 determines whether a weight is to be applied to the matched first image by the weight calculator 700, by using Equation 3 below:

$$x_{VISIBLE} > (m_{IR}+\text{const}_{IR} \times \text{std}_{IR}) \quad (3)$$

wherein $x_{VISIBLE}$ denotes a pixel brightness value of the matched first image, $(m_{IR}+\text{const}_{IR} \times \text{std}_{IR})$ denotes the first threshold value, $m_{IR}$ denotes an average brightness value of the matched second image, $\text{const}_{IR}$ denotes a constant, for example, 3, and $\text{std}_{IR}$ denotes a brightness standard deviation of the matched second image.

If the brightness of the matched first image exceeds the first threshold value as Equation 3 above, the weight calculator 700 determines that the weight is to be applied to the matched first image and calculates the first weight. The first weight is calculated as in Equation 4 below:

$$w_{VISIBLE} = P_{VISIBLE}/(P_{VISIBLE} + P_{IR}) \quad (4)$$

wherein, $$P_{VISIBLE} = x_{VISIBLE}/(x_{VISIBLE} + x_{IRt})$$

$$P_{IR} = x_{IRt}/(x_{VISIBLE} + x_{IRt}) \times \alpha,$$

$$\alpha = \begin{cases} C, & \text{if } x_{VISIBLE} > (m_{IR} + \text{const}_{IR} \times \text{std}_{IR}) \\ 1, & \text{otherwise} \end{cases}$$

wherein $w_{VISIBLE}$ denotes the first weight of the matched first image, $x_{VISIBLE}$ denotes the pixel brightness value of the matched first image, $x_{IRt}$ denotes a pixel brightness value of the converted second image, and a denotes a constant C that is 4.

If the brightness of the matched first image does not exceed the first threshold value, the weight calculator 700 determines whether a weight is to be applied to the converted second image, by using Equation 5 below:

$$x_{IR} > (m_{VISIBLE}+\text{const}_{VISIBLE} \times \text{std}_{VISIBLE}) \quad (5)$$

wherein $x_{IR}$ denotes the pixel brightness value of the matched second image, $(m_{VISIBLE}+\text{const}_{VISIBLE} \times \text{std}_{VISIBLE})$ denotes the second threshold value, $m_{VISIBLE}$ denotes the average brightness value of the matched first image, $const_{VISIBLE}$ denotes a constant that is 2, and $std_{VISIBLE}$ denotes the brightness standard deviation.

If the brightness of the matched second image exceeds the second threshold value as in Equation 5 above, the weight calculator 700 determines that the weight is to be applied to the matched second image and calculates the second weight. The second weight is calculate by using Equation 6 below:

$$w_{IR}=P_{IR}/(P_{VISIBLE}+P_{IR}) \quad (6)$$

Figure 5:
FIG. 5 is a view illustrating a result of fusing the first and second images according to an exemplary embodiment.

Thereafter, the image fuser 800 applies statistical information and a calculated weight to fuse the first and second images. FIG. 5 illustrates a result of fusing the first and second images.

As described above, the apparatus 10 may complement weakness with respect to illumination of the first camera 100 and weakness of collecting texture information of the second camera 200 by fusing the first and second images so as to improve an image quality.

FIG. 6 is a flowchart illustrating a method of fusing images according to an exemplary embodiment. The same descriptions of FIG. 6 as those of FIGS. 1 through 5 are omitted.

Referring to FIG. 6, in operation S10, the apparatus 10 matches a first image of a subject captured by the first camera and a second image of the subject captured by the second camera 200.

If the first and second images are completely matched in operation S10, the apparatus 10 calculates brightness averages and brightness standard deviations of the matched first and second images as statistical information in operation S20.

If the statistical information is completely calculated in operation S20, the apparatus 10 converts brightness of the matched second image based on the average brightness of the matched first image in operation S30. The apparatus 10 performs brightness enhancement processing with respect to a predetermined area of the second image having a higher a brightness average than the first image and performs brightness attenuation processing with respect to a predetermined image of the second image having a lower brightness average than the first image.

If the brightness of the second image is completely converted in operation S30, the apparatus 10 determines whether the brightness of the matched first image exceeds a first threshold value to determine whether a weight is to be applied to the first image in operation S40.

If the brightness of the matched first image exceeds the first threshold value in operation S40, the apparatus 10 calculates a first weight of the first image in operation S50.

In operation S60, the apparatus 10 determines whether brightness of the converted second image exceeds a second threshold value.

If the brightness of the converted second image exceeds the second threshold value in operation S60, the apparatus 10 calculates a second weight of the converted second image in operation S70.

However, if the brightness of the matched first image does not exceed the first threshold value, and the brightness of the converted second image does not exceed the second threshold value, the apparatus 10 does not apply a weight in operation S80.

In operation S90, the apparatus 10 applies the statistical information and the calculated weight (or does not apply the calculated weight) to fuse the matched first and second images.

The present inventive concept can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A method of merging images, the method comprising:
providing a first image of a subject captured by a first camera and a second image of the subject captured by a second camera;
calculating a brightness average of the first image;
converting brightness of the second image based on comparison between the brightness average of the first image and the brightness of the second image; and
merging the first image and the second image having the converted brightness,
wherein the converting the brightness of the second image comprises:
performing brightness attenuation processing according to the following equation:

$$x_{IRt}=[(x_{IR}-m_{VISIBLE})/m_{VISIBLE}+1]^2, \text{ if } x_{IR} \leq m_{VISIBLE}; \text{ or}$$

performing brightness enhancement processing according to the following equation:

$$x_{IRt}=[(x_{IR}-m_{VISIBLE}) \times m_{VISIBLE}+1]^2, \text{ if } x_{IR} > m_{VISIBLE}$$

where $x_{IRt}$ denotes brightness of the converted second image, $x_{IR}$ denotes the brightness of the second image and $m_{VISIBLE}$ denotes the brightness average of the first image.

2. The method of claim 1, wherein the providing the first and second image comprises:
matching the first image;
matching the second image captured at a different wavelength range from the first image; and
providing the matched first and second images.

3. The method of claim 1, wherein the first camera comprises a visible camera, and the second camera comprises an infrared (IR) camera.

4. The method of claim 1, further comprising calculating a brightness standard deviation of each of the first and second images.

5. The method of claim 1, wherein the performing the brightness enhancement processing comprises multiplying a difference between a-brightness of the second image and the brightness average of the first image by the brightness average of the first image.

6. The method of claim 1, wherein the performing the brightness attenuation processing comprises dividing a difference between brightness of the second image and the brightness average of the first image by the brightness average of the first image.

7. The method of claim 1, further comprising:
calculating a first weight to apply the first weight to the first image when merging the first and second images in response to brightness of the first image being higher than a first threshold value; and
calculating a second weight to apply the second weight to the second image when merging the first and second images in response to the converted brightness of the second image being higher than a second threshold value.

8. The method of claim 7, wherein the first threshold value is calculated by adding a brightness average of the second image to a product of a first constant and a brightness standard deviation of the second image, and
wherein the second threshold value is calculated by adding a brightness average of the first image to a product of a second constant and a brightness standard deviation of the first image.

9. An apparatus for merging images, the apparatus comprising:
a first camera configured to capture a first image of a subject;
a second camera configured to capture a second image of the subject, the second image captured at a different wavelength range from the first camera;
a statistical information calculator configured to calculate a brightness average of the first image;
a converter configured to convert brightness of the second image based on comparison between the brightness average of the first image and brightness of the second image; and
a merger configured to merge the first image and the second image having the converted brightness,
wherein the converter is configured to perform brightness attenuation processing according to the following equation:

$$x_{IRt} = [(x_{IR} - m_{VISIBLE})/m_{VISIBLE} + 1]^2, \text{ if } x_{IR} \leq m_{VISIBLE}$$

or configured to perform the brightness enhancement processing according to the following equation:

$$x_{IRt} = [(x_{IR} - m_{VISIBLE}) \times m_{VISIBLE} + 1]^2, \text{ if } x_{IR} > m_{VISIBLE},$$

where $x_{IRt}$ denotes brightness of the converted second image, $x_{IR}$ denotes the brightness of the second image and $m_{VISIBLE}$ denotes the brightness average of the first image.

10. The apparatus of claim 9 further comprising a matching unit configured to match the first image of the subject and configured to match the second image of the subject.

11. The apparatus of claim 9, wherein the first camera comprises a visible camera, and the second camera comprises an IR camera.

12. The apparatus of claim 10, wherein the statistical information calculator is configured to calculate a brightness standard deviation of each of the matched first and second images.

13. The apparatus of claim 9, wherein the converter is configured to perform the brightness enhancement processing by multiplying a difference between brightness of the second image and the brightness average of the first image by the brightness average of the first image.

14. The apparatus of claim 9, wherein the converter is configured to perform the brightness attenuation processing by dividing a difference between a brightness of the second image and the brightness average of the first image by the brightness average of the first image.

15. The apparatus of claim 9, further comprising:
a weight calculator configured to calculate a first weight to apply the first weight to the first image when the merger merges the first and second images in response to brightness of the first image being higher than a first threshold value and configured to calculate a second weight to apply the second weight to the second image when the merger merges the first and second images in response to the converted brightness of the second image being higher than a second threshold value.

16. The apparatus of claim 15, wherein the first threshold value is calculated by adding a brightness average of the second image to a product of a first constant and a brightness standard deviation of the second image, and
wherein the second threshold value is calculated by adding a brightness average of the first image to a product of a second constant and a brightness standard deviation of the first image.

17. A non-transitory computer-readable recording medium storing a computer program for executing the method of claim 1.

* * * * *